United States Patent [19]

Muth

[11] Patent Number: 5,495,978
[45] Date of Patent: Mar. 5, 1996

[54] BONDING DIVERSE THERMAL EXPANSION MATERIALS

[75] Inventor: David L. Muth, Columbia, Pa.

[73] Assignee: Thermacore, Inc., Lancaster, Pa.

[21] Appl. No.: 300,857

[22] Filed: Sep. 6, 1994

[51] Int. Cl.⁶ ............................ B23K 1/19; B23K 103/16
[52] U.S. Cl. .................... 228/122.1; 228/124.6; 228/248.1; 419/9; 419/47
[58] Field of Search ................... 228/121, 122.1, 228/124.6, 190, 248.1; 419/8–11, 47

[56] References Cited

U.S. PATENT DOCUMENTS

| | | | |
|---|---|---|---|
| 2,057,661 | 10/1936 | LeVan | 403/30 |
| 3,055,465 | 9/1962 | Pulfrich | 403/30 |
| 3,711,361 | 1/1973 | Casadevall | 403/30 |
| 3,823,772 | 7/1974 | Lavering et al. | 403/30 |
| 4,352,951 | 10/1982 | Kyle | 403/30 |
| 4,769,525 | 9/1988 | Leatham | 228/123.1 |
| 5,013,615 | 5/1991 | Sisolak | 403/30 |
| 5,070,591 | 12/1991 | Quick et al. | 164/91 |
| 5,463,293 | 9/1995 | Beane et al. | 427/96 |

FOREIGN PATENT DOCUMENTS

| | | | |
|---|---|---|---|
| 25541 | 1/1990 | Japan | 228/122.1 |
| 639563 | 2/1994 | Japan | 228/122.1 |

OTHER PUBLICATIONS

Lindquist, Lloyd O, and Mah, Richard, "Graphite to Metal Bonding Techniques", Therm. Conduct., pub. 1978, pp. 125–132.

Primary Examiner—Samuel M. Heinrich
Attorney, Agent, or Firm—Martin Fruitman

[57] ABSTRACT

The disclosure is for a method of bonding materials with severely mismatched coefficients of thermal expansion, such as carbon/carbon and a composite of aluminum oxide and niobium and for the structure of the bonded joint. The key to a good bond between such materials is the use of a thin layer of porous sintered metal as an intermediate material which is bonded to the two diverse thermal expansion materials. The sintered material has a porosity of 20 to 80 percent, and stays bonded to both of the different material surfaces while the sintered material itself is also not destroyed by the thermal stress.

3 Claims, 2 Drawing Sheets

BONDING DIVERSE THERMAL EXPANSION MATERIALS

BACKGROUND OF THE INVENTION

The invention deals generally with joints and more specifically with the bonding of materials of diverse thermal expansions by the use of an intermediate additional material.

The problem of joining materials with substantial differences in thermal expansion has existed for a long time. The difficulties with such bonds became obvious early in the development of electronic tubes because of the necessity of bringing electrical connections through the glass envelope of a tube, and they continue today even in semiconductor technology, because in that field there is also a requirement for bonding electrical conductors to electrical insulators.

However, the problem of such bonds is most severe in applications where significant heat or power is involved. Under circumstances where materials are raised to high temperatures, the differences in both the coefficient of thermal expansion and the actual dimensions of the materials are greatly increased. It is such exaggerated differences which usually cause the failure of bonds between materials. Ironically, material research technology which has dramatically increased the availability of new high temperature materials has only made the problem of differences in thermal expansion more severe. For instance, the new very high temperature material identified as carbon/carbon has a thermal expansion of essentially zero, and that means that there are difficulties in bonding it to virtually every metal, because metals all have significant coefficients of thermal expansion.

The classic manner of bonding two materials with different rates of thermal expansion has been to use a bonding material between them which has a coefficient of thermal expansion which is intermediate to the coefficients of thermal expansion of the materials being bonded. In that way, the stress of the differences in expansion of the materials is divided between the bonds on the two sides of the intermediate material. In fact, in severe cases of either large differences in thermal expansion coefficients or exceptionally fragile materials, several intermediate materials, each with progressively different thermal expansion coefficients have been used. This technique divides the thermal stress among more surface bonds and therefore decreases the likelihood of failure.

Another method of accommodating structures to the differences in thermal expansion of the materials used in their construction is to design the parts with mechanical strain relief. The simplest example of such a structure might be a very thin metal cylinder bonded to the end of a ceramic cylinder, a structure which appears frequently in high power electron tubes. In such a structure, the flexibility of the thin metal cylinder actually permits the cylinder to distort as it expands, and thereby limits the stress on the joint.

Both of these techniques of the prior art are difficult and expensive to implement. Moreover, since one requires the selection of specific intermediate materials and the other requires special structures, they are not always available for all applications, regardless of cost.

SUMMARY OF THE INVENTION

The present invention offers a technique for bonding materials with diverse coefficients of thermal expansion which has been successful in what is perhaps the most severe application for such joints, the bonding together of two flat surfaces. Furthermore, the method of the invention is surprisingly simple and requires no exotic materials or complex configurations.

The preferred embodiment of the invention entails the bonding of the two surfaces with different coefficients of thermal expansion simply by the use of a thin layer of sintered material between the two layers to be joined. When the sintered material has a porosity of 20 to 80 percent, a particle diameter of 0.42 mm, and a layer thickness of at least the dimension of the diameter of two particles of the material, the joint survives repeated thermal cycling over a wide temperature range.

It is theorized that the reason that such a joint survives is because the sintered material shifts internally so that the bond between the sintered layer and both adjacent surfaces remains intact, while the sintered layer is not itself destroyed because the voids within the sintered layer permit the solid particles within the layer to deflect. In effect, the sintered layer acts much as a conventional hair brush does when the bristles are placed on a coarse surface and the brush handle is moved. In such a demonstration, the bristles deflect into the spaces separating them, even though the ends of each individual bristle do not move from the surface which they are contacting.

Since the techniques of sintering materials and bonding sintered layers to solid surfaces are well understood, the present invention furnishes a simple and inexpensive method of bonding together materials with very different thermal expansion coefficients.

DETAILED DESCRIPTION OF THE INVENTION

Figure 1:
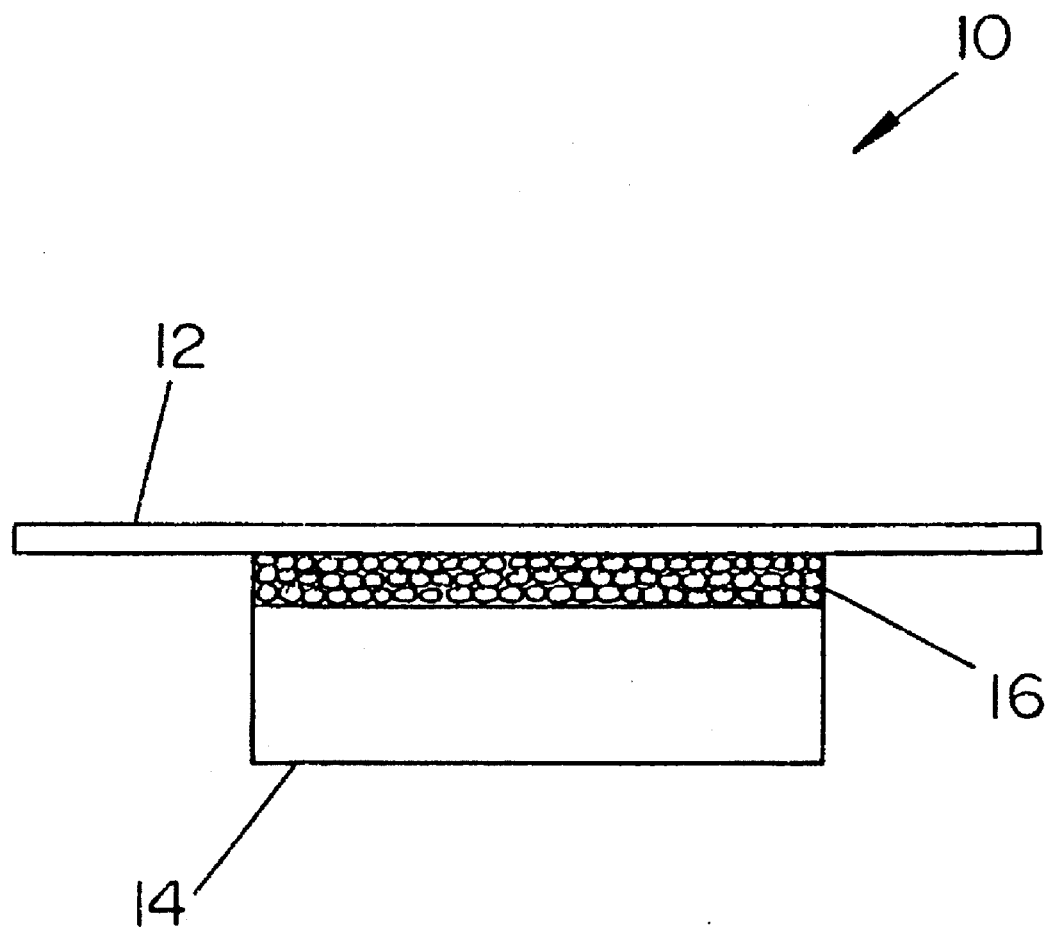
FIG. 1 is a cross section view of the preferred embodiment of the invention showing two surfaces bonded together with a sintered layer between them.

FIG. 1 is a cross section view of the preferred embodiment of a joint 10 in which low thermal expansion material 12 is bonded to high thermal expansion material 14 by the use of sintered layer 16. FIG. 1 does not show the layers to scale.

One example of a material which can be used for low thermal expansion material 14 is carbon/carbon which is a material consisting of woven carbon fibers impregnated with additional carbon. Carbon/carbon has the desirable characteristics of being of low mass, low emissivity, and very strong, and having a high thermal conductivity. The difficulty with carbon/carbon is, however, that it has a coefficient of thermal expansion of only −0.05 to +0.1×10 to the minus 6 inch/inch/degree C., and this characteristic makes it difficult to bond to other materials in assemblies if the assembly is to be subjected to any significant heat.

The present invention has made it possible to bond carbon/carbon to a material such as a composite of aluminum oxide and niobium which has the coefficient of thermal expansion of 6.0 to 7.0×10 to the minus 6 inch/inch/degree C., which is very high when compared to carbon/carbon. The preferred embodiment of this joint includes a bond between a carbon/carbon layer 12 which is 0.022 inch thick and an aluminum oxide and niobium layer 14 which is 0.015 inch thick along a bond with dimensions of 1.187 inches by 1.5 inches. Such a bond survived 15 thermal cycles taking it from 580 degrees centigrade to 1000 degrees centigrade in 20 seconds.

The joint shown in FIG. 1 is constructed with low thermal expansion material 12 and high thermal expansion material 14 by using sintered copper as the intermediate material 16 between material 12 and material 14. The layer of sintered copper is 10100 type pure copper, which is 0.040 inch thick and has a particle diameter of 0.42 mm and a porosity of 40 percent.

Figure 2:
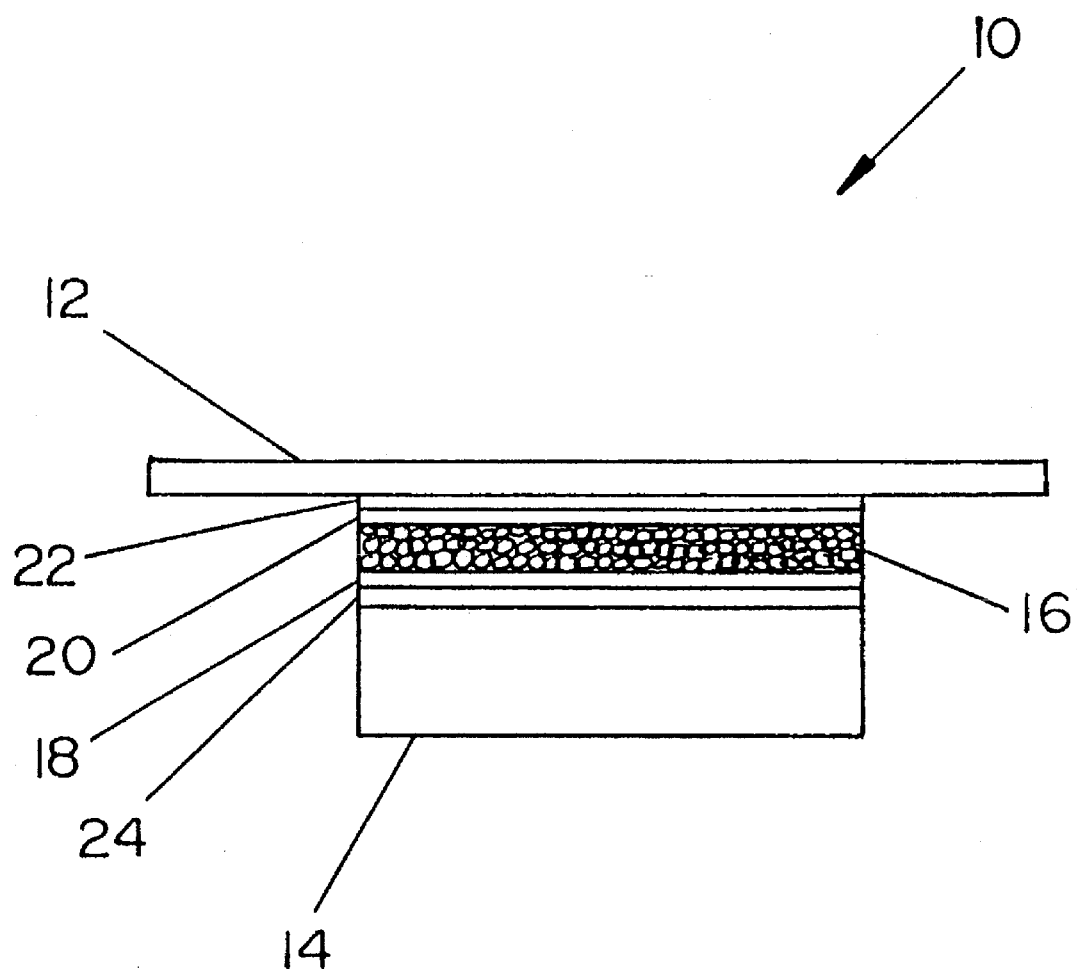
FIG. 2 is a cross section view of the arrangement of materials for the practice of the process of the invention.

FIG. 2 is a cross section view which shows the arrangement of materials for the process of constructing the bond of the preferred embodiment. FIG. 2 does not show the layers to scale.

The bonding process of the preferred embodiment is performed by:

(A) placing a layer of brazing material 18 with a thickness in the range between 0.0005 inch and 0.0015 inch on one surface of high expansion material layer 14;

(B) selecting a sinterable material 16 with a particle diameter in the range between 0.125 mm and 1.00 mm which will have a porosity after sintering in the range between 20 percent and 80 percent;

(C) placing a layer of the selected sinterable material 16 with a thickness of at least twice the diameter of the particles in the selected sinterable material to cover the exposed surface of brazing material 18;

(D) placing a layer of brazing material 20 with a thickness in the range between 0.0005 inch and 0.0015 inch on the exposed surface of the layer of applied sinterable material 16;

(E) placing a surface of low expansion material layer 12 in contact with the exposed surface of brazing material 20; and (F) sintering layer 16 and bonding layers 12 and 14 to layer 16 by raising the temperature of the assembled layers to a temperature high enough to melt the brazing material and cause the brazing material to wet material layers 12 and 14.

In order to assure a proper bond, it is sometimes also desirable to clean oxides from the surfaces of low expansion material 12 and high expansion material 14 by applying reactive material layers 22 and 24 to the surfaces to be bonded as the layers are being assembled. The reactive material then cleans oxides from the surfaces as the temperature rises. In the preferred embodiment a 0.001 inch thick layer of titanium can be applied as the reactive material when the brazing material used is gold/copper/nickel.

The process described above consistently yields thermally reliable joints between materials of widely differing thermal expansion. Joints made according to the invention survive multiple cycles of heating to extreme temperatures followed by reduced temperatures, despite the fact that such thermal cycling invariably causes the failure of other bonds between such materials of differing thermal expansion.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, materials other than metals can be used as the sintered intermediate layer, particularly if the thermal conductivity of the bond is not important. Moreover, either sintered powder or sintered fibers can be used in the sintered intermediate layer.

What is claimed as new and for which Letters patent of the United States are desired to be secured is:

1. A process for bonding materials with different coefficients of thermal expansion comprising:

(A) placing a first layer of brazing material 18 with a thickness in the range between 0.0005 inch and 0.0015 inch on one surface of a higher thermal expansion material layer;

(B) selecting a sinterable material with a particle diameter in the range between 0.125 mm and 1.00 mm so that the sinterable material will have a porosity after sintering in the range between 20 percent and 80 percent;

(C) placing a layer of the selected sinterable material with a thickness of at least twice the diameter of the particles in the selected sinterable material to cover the exposed surface of the first layer of brazing material;

(D) placing a second layer of brazing material 20 with a thickness in the range between 0.0005 inch and 0.0015 inch on the exposed surface of the layer of applied sinterable material;

(E) placing a surface of a lower expansion material layer in contact with the exposed surface of the second layer of brazing material; and (F) sintering the sinterable layer and bonding the higher thermal expansion layer and the lower thermal expansion layer to the sinterable layer by raising the temperature of the assembled layers to a temperature high enough to melt the brazing material and to cause the brazing material to wet the surfaces of the higher and lower thermal expansion layers.

2. The process of claim 1 further including the step of placing a reactive material layer between the surface of the lower thermal expansion material and the second layer of brazing material.

3. The process of claim 1 further including the step of placing a reactive material layer between the surface of the higher thermal expansion material and the first layer of brazing material.

* * * * *